US012597655B2

(12) United States Patent
Rached et al.

(10) Patent No.: US 12,597,655 B2
(45) **Date of Patent: *Apr. 7, 2026**

(54) DEVICE FOR COOLING AND/OR HEATING A BATTERY OF AN ELECTRIC OR HYBRID MOTOR VEHICLE

(71) Applicant: Arkema France, Colombes (FR)

(72) Inventors: Wissam Rached, Chaponost (FR); Nicolas Dufaure, Bernay (FR)

(73) Assignee: ARKEMA FRANCE, Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/766,323

(22) PCT Filed: Nov. 20, 2018

(86) PCT No.: PCT/EP2018/081861

§ 371 (c)(1),
(2) Date: May 22, 2020

(87) PCT Pub. No.: WO2019/101716

PCT Pub. Date: May 31, 2019

(65) Prior Publication Data

US 2020/0365958 A1 Nov. 19, 2020

(30) Foreign Application Priority Data

Nov. 24, 2017 (FR) ...................................... 1761145

(51) Int. Cl.
*H01M 10/6567* (2014.01)
*B60L 50/64* (2019.01)
(Continued)

(52) U.S. Cl.
CPC ......... *H01M 10/6567* (2015.04); *B60L 50/64* (2019.02); *H01M 10/613* (2015.04);
(Continued)

(58) Field of Classification Search
CPC ........... H01M 10/6567; H01M 10/613; H01M 10/615; H01M 10/625; H01M 10/653;
(Continued)

(56) References Cited

U.S. PATENT DOCUMENTS 2,705,227 A 3/1955 Stoeff
4,230,838 A 10/1980 Foy et al.
(Continued)

FOREIGN PATENT DOCUMENTS

CN 102652372 A * 8/2012 .......... H01M 10/613
CN 103140957 A * 6/2013 ............... B26D 1/00
(Continued)

OTHER PUBLICATIONS

International Search Report (PCT/ISA/210) mailed on Feb. 14, 2019, by the European Patent Office as the International Searching Authority for International Application No. PCT/EP2018/081861.
(Continued)

*Primary Examiner* — Kaity V Chandler
(74) *Attorney, Agent, or Firm* — Boone IP Law

(57) ABSTRACT

A device for cooling and/or heating a battery of an electric or hybrid motor vehicle, including a battery box provided with: at least one envelope of a composition including between 0 and 80 wt. %, in relation to the total weight of the composition, of reinforcing fibres, between 0 and 20 wt. %, in relation to the total weight, of at least one thermoconductive component, between 0 and 20 wt. %, in relation to the total weight, of at least one impact modifier, and between 0 and 20 wt. %, in relation to the total weight of the composition, of additives, the remainder being a matrix predominantly including at least one polyamide and optionally at least one flameproofing agent; an inlet for a heat-transfer fluid; and an outlet for a heat-transfer fluid, the box defining a battery cooling and/or heating space.

5 Claims, 1 Drawing Sheet

(51) Int. Cl.

| | |
|---|---|
| ***H01M 10/10*** | (2006.01) |
| ***H01M 10/613*** | (2014.01) |
| ***H01M 10/615*** | (2014.01) |
| ***H01M 10/625*** | (2014.01) |
| ***H01M 10/653*** | (2014.01) |
| ***H01M 10/6556*** | (2014.01) |
| ***H01M 50/24*** | (2021.01) |

(52) U.S. Cl.

CPC ....... *H01M 10/615* (2015.04); *H01M 10/625* (2015.04); *H01M 10/653* (2015.04); *H01M 10/6556* (2015.04); *H01M 50/24* (2021.01); *H01M 2220/20* (2013.01)

(58) Field of Classification Search

CPC .. H01M 10/6556; H01M 50/20; H01M 50/24; H01M 2220/20; B60L 50/64; Y02E 60/10; Y02T 10/70

See application file for complete search history.

(56) References Cited

U.S. PATENT DOCUMENTS

| | | | | |
|---|---|---|---|---|
| 5,460,900 | A | 10/1995 | Rao et al. | |
| 2003/0111776 | A1 | 6/2003 | Joachimi et al. | |
| 2004/0265660 | A1 | 12/2004 | Reuschel et al. | |
| 2008/0274355 | A1 | 11/2008 | Hewel | |
| 2012/0175549 | A1 | 7/2012 | Yoshihara et al. | |
| 2013/0004808 | A1 | 1/2013 | Tschismar | |
| 2013/0052491 | A1* | 2/2013 | Bull | H01M 10/6565 429/50 |
| 2013/0207459 | A1 | 8/2013 | Schroeder et al. | |
| 2013/0252059 | A1* | 9/2013 | Choi | H01M 50/24 156/60 |
| 2014/0048841 | A1 | 2/2014 | Kim et al. | |
| 2015/0086738 | A1* | 3/2015 | Nitsche | C08K 5/18 524/400 |
| 2015/0325826 | A1 | 11/2015 | Verhaag et al. | |

FOREIGN PATENT DOCUMENTS

| | | | | | |
|---|---|---|---|---|---|
| CN | 104919623 | A | | 9/2015 | |
| CN | 106972191 | A | * | 7/2017 | H01M 10/6568 |
| CN | 108140746 | A | * | 6/2018 | B60L 1/003 |
| CN | 110299476 | A | * | 10/2019 | H01B 3/302 |
| EP | 0342066 | A1 | | 11/1989 | |
| EP | 0471566 | A1 | | 2/1992 | |
| EP | 0902494 | A1 | | 3/1999 | |
| EP | 2608309 | A1 | | 6/2013 | |
| EP | 2694588 | B1 | | 4/2015 | |
| FR | 2273021 | A1 | | 12/1975 | |
| FR | 3001341 | A1 | | 7/2014 | |
| JP | 850-159586 | A | | 12/1975 | |
| JP | H06-24238 | A | | 2/1994 | |
| JP | H11-144756 | A | | 5/1999 | |
| JP | 2012252959 | A | * | 12/2012 | Y02E 60/10 |
| JP | 2013-513909 | A | | 4/2013 | |
| JP | 2014-523449 | A | | 9/2014 | |
| JP | 2015-505142 | A | | 2/2015 | |
| JP | 2016-094508 | A | | 5/2016 | |
| WO | 2011/033815 | A1 | | 3/2011 | |

OTHER PUBLICATIONS

Written Opinion (PCT/ISA/237) mailed on Feb. 14, 2019, by the European Patent Office as the International Searching Authority for International Application No. PCT/EP2018/081861.

Office Action (Notice of Reasons for Rejection) issued on Nov. 15, 2022, by the Japanese Patent Office in corresponding Japanese Patent Application No. 2020-527988, and an English Translation of the Office Action. (10 pages).

Office Action (the First Office Action) issued on Mar. 28, 2023, by the China National Intellectual Property Administration in corresponding Chinese Patent Application No. 201880075764.3, English Translation only. (10 pages).

Office Action (Rejection Decision) mailed on May 1, 2024, by the China National Intellectual Property Administration for Chinese Application No. 21880075764.3, 14 pages.

"Engineering plastics and polyurethanes for automotive electrics" BASF, 38 pages, Aug. 31, 2016.

Thomason, J. I. et al."The dimensional stability of glass-fibre reinforced polyamide 66 during hydrolysis conditioning" Elsevier, Composites: Part A, vol. 40, 2009, pp. 625-634.

* cited by examiner

DEVICE FOR COOLING AND/OR HEATING A BATTERY OF AN ELECTRIC OR HYBRID MOTOR VEHICLE

The present invention relates generally to the field of electric or hybrid motor vehicles requiring the use of electric batteries.

More precisely, the invention relates to a cooling and/or heating device for a battery for an electric or hybrid motor vehicle.

An "electric motor vehicle" is understood to mean a vehicle as defined in United Nations Regulation No. 100 concerning the approval of electric battery vehicles.

One of the goals sought in the automotive field is to propose less and less polluting vehicles. Thus, electric or hybrid vehicles comprising a battery aim to progressively replace combustion engine vehicles such as either gas or diesel vehicles.

It has turned out that the battery is a relatively complex vehicle component. Depending on the positioning of the battery in the vehicle, it can be necessary to protect it from impact and from the outside environment, which can have extreme temperatures and variable humidity. It is also necessary to avoid any risk of flames.

Additionally, it is important that the operating temperature thereof not exceed 55° C. in order to not break down the cells of the battery and to preserve the life thereof. Conversely, for example in winter, it can be necessary to increase the battery temperature so as to optimize operation thereof.

The electric or hybrid motor vehicle thus needs a cooling and/or heating device for the battery.

Cooling devices for a battery, consisting in the circulation of a heat transfer fluid around the battery, are known, as are batteries comprising a protective compartment. In particular, today, batteries are equipped with a metal compartment.

Additionally, the shapes given to a metal structure result from a stamping method. However, when the shape of the compartment is complex, for example because of its placement, the stamping method is not the most effective for obtaining this type of specificity.

This compartment also has the disadvantage of being relatively heavy and breaking down relatively quickly over time, in particular if it is located in a humid environment.

Thus, materials are sought for replacing the known metal structures, which meet the specific list of specifications mentioned above, and for improving the thermal transfer occurring between the battery and the heat transfer fluid in a cooling device for a battery.

These goals are achieved because of a cooling and/or heating device for an electric or hybrid motor vehicle battery comprising a battery box provided with:

- at least one envelope consisting of a composition comprising:
- 0 to 80% by weight in relation to the total weight of the composition of reinforcing fibres, preferably from 0.1 to 80%, and more preferably from 5 to 80%;
- 0 to 20% by weight in relation to the total weight of at least one thermoconductive component, preferably from 0.1 to 20%, and more preferably from 5 to 20%;
- 0 to 20% by weight in relation to the total weight of at least one impact modifier, preferably from 0.1 to 20%, and more preferably from 5 to 20%;
- 0 to 20% by weight in relation to the total weight of the composition of additives, preferably from 0.1 to 15%, and more preferably from 1 to 15%;
- wherein the complement is a matrix comprising mostly at least one polyamide and optionally at least one flameproofing agent;
- a heat transfer fluid inlet; and
- a heat transfer fluid outlet, wherein the compartment delimits a cooling and/or heating volume of the battery.

For the purposes of the present invention, "battery box" is understood to mean an envelope or box, which is placed around the battery. The compartment defined in the cooling and/or heating device of the present invention is not a constituent element of the battery. The function of the compartment is to protect the battery. The term compartment also designates a housing. The term compartment does not refer to a part of the vehicle intended, among other things, to receive suitcases and other objects.

The cooling and/or heating device for a battery according to the invention has the advantage of being lighter than a device comprising a metal structure. This weight savings contributes to the impact on the desired energy or fuel efficiency for vehicles described as clean.

Depending on the placement thereof in the vehicle, this compartment can be found in contact with an aggressive environment: high temperature in summer, very low temperature in winter, contact with zinc chloride, impacts, high humidity. It was observed that the compartment according to the invention has a satisfactory resistance to these external stresses.

Further, required inflammability criteria can be met by the possible presence of flameproofing agents.

Further, it was observed that according to automobile manufacturers, the shape of the batteries could be varied. In fact, the manufacturers seek to house this battery in spaces unused or relatively unusable until now. The shaping of a plastic by molding or injection is easier to do than that of a metal plate.

Other characteristics, features, subjects and benefits of the present invention will appear even more clearly after reading the description and examples that follow.

It is further indicated that the expressions "included between . . . and . . . " and "from . . . to . . . " used in the present description must be understood as including each of the indicated limits.

The Device

Polyamide

The compartment of the cooling and/or heating device according to the invention comprises at least one envelope consisting of a composition comprising a matrix comprising at least one polyamide.

According to the present invention, the term "polyamide," also denoted PA, covers:

- homopolymers;
- copolymers, or copolyamides, based on different amide units, such as, for example, the 6/12 copolyamide with amide units derived from lactam-6 and lactam-12.

The nomenclature used to define the polyamides is described in ISO standard 1874-1:1992 *"Plastics—Polyamide (PA) molding and extrusion materials—Part 1: Designation,"* in particular on page 3 (Tables 1 and 2) and is well known to the person skilled in the art.

Generally, polyamides comprise at least two identical or different repeating units, where these units are formed from the two corresponding monomers, or comonomers. The polyamides are therefore prepared from two or more monomers, or comonomers, chosen among an amino acid, a lactam and/or a carboxylic diacid and a diamine.

The polyamide according to the invention can be a homopolyamide and comprise at least two identical repeating units obtained by polycondensation of monomers chosen among an amino acid, a lactam and a unit satisfying the formula (Ca diamine)·(Cb diacid), with a representing the number of carbons in the diamine and b representing the number of carbons in the diacid, where a and b are each between 4 and 36, such as defined below.

The polyamide according to the invention can also be a copolyamide and comprise at least two distinct repeating units, where these units can be obtained by polycondensation of monomers chosen among an amino acid, a lactam and a unit satisfying the formula (Ca diamine)·(Cb diacid), with a representing the number of carbons in the diamine and b representing the number of carbons in the diacid, where a and b are each between 4 and 36, such as defined below.

The polyamide according to the invention can be aliphatic, cycloaliphatic, semi-aromatic or even aromatic.

The polyamide according to the invention can comprise at least one amino acid chosen from 9-aminononanoic acid, 10-aminodecanoic acid, 12-aminododecanoic acid and 11-aminoundecanoic acid and derivatives thereof, in particular N-heptyl-11-aminoundecanoic acid.

The polyamide according to the invention can comprise at least one lactam chosen among pyrrolidinone, piperidinone, caprolactam, enantholactam, caprylolactam, pelargolactam, decanolactam, undecanolactam, and laurolactam.

The polyamide according to the invention can comprise at least one unit satisfying the formula (Ca diamine)·(Cb diacid).

When the (Ca diamine) unit is an aliphatic and linear diamine with formula, $H_2N—(CH_2)_a—NH_2$, the Ca diamine is chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecanediamine (a=18), eicosanediamine (a=20), docosanediamine (a=22) and diamines obtained from fatty acids.

The Ca diamine can be a branched aliphatic diamine chosen from methyl-pentane-methylene-diamine (MPMD).

When the diamine is cycloaliphatic, it is chosen from bis(3,5-dialkyl-4-aminocyclohexy)methane, bis(3,5-dialkyl-4-aminocyclohexyl)ethane, bis(3,5-dialkyl-4-aminocyclohexyl)propane, bis(3,5-dialkyl-4-aminocyclo-hexy)butane, bis-(3-methyl-4-aminocyclohexyl)-methane (BMACM or MACM), p-bis(aminocyclohexyl)-methane (PACM) and isopropylidenedi(cyclohexylamine) (PACP), cis and trans 1,3-bis(aminomethyl)cyclohexane (1,3-BAC, CAS number 2579-20-6), and cis and trans 1,4 bis(aminomethyl)cyclohexane (1,4-BAC, CAS number 2549-07-9).

It may also include the following carbon backbones: norbornyl methane, cyclohexylmethane, dicyclohexylpropane, di(methylcyclohexyl), di(methylcyclohexyl) propane. A non-exhaustive list of these cycloaliphatic diamines is given in the publication "Cycloaliphatic Amines" (Encyclopaedia of Chemical Technology, Kirk-Othmer, 4th Edition (1992), pp. 386-405).

When the diamine is alkylaromatic, it is chosen from 1,3-xylylene diamine and 1,4-xylylene diamine and mixtures thereof.

When the monomer (Cb diacid) is aliphatic and linear, it is chosen from succinic acid (y=4), pentanedioic acid (y=5), adipic acid (y=6), heptanedioic acid (y=7), octanedioic acid (y=8), azelaic acid (y=9), sebacic acid (y=10), undecanedioic acid (y=11), dodecanedioic acid (y=12), brassylic acid (y=13), tetradecanedioic acid (y=14), hexadecanedioic acid (y=16), octadecanoic acid (y=18), octadecenedioic acid (y=18), eicosanedioic acid (y=20), docosanedioic acid (y=22) and fatty acid dimers containing 36 carbons.

The fatty acid dimers mentioned above are dimerized fatty acids obtained by oligomerization or polymerization of monobasic unsaturated long-chain hydrocarbon fatty acids (such as linoleic acid and oleic acid), as described in particular in document EP 0,471,566.

When the diacid is cycloaliphatic, it can include the following carbon backbones: norbornylmethane, cyclohexylmethane, dicyclohexylmethane, dicyclohexylpropane, di(methylcyclohexyl), di(methylcyclohexyl)propane.

When the diacid is aromatic, it is chosen from terephthalic acid, isophthalic acid and naphthalenic diacid.

The following can be given as examples of copolyamides: caprolactam and laurolactam copolymers (PA 6/12), caprolactam, adipic acid and hexamethyl diamine copolymers (PA 6/66), caprolactam, laurolactam and adipic acid and hexamethylene diamine copolymers (PA 6/12/66), caprolactam, azalaic acid and hexamethylene diamine, 11-aminoundecanoic acid and laurolactam copolymers (PA 6/69/11/12), caprolactam, adipic acid and hexamethylene diamine, 11-aminoundecanoic acid and laurolactam copolymers (PA 6/66/11/12), as azelaic acid and hexamethylene diamine and laurolactam copolymers (PA 69/12).

Preferably, the polyamide used in the composition according to the invention is chosen from the PA6 homopolyamide resulting from polycondensation of caprolactam or aminocaproic acid, the PA11 homopolyamide resulting from polycondensation of 11-aminoundecanoic acid, the PA12 homopolyamide resulting from polycondensation of laurolactam or 12-aminododecanoic acid, the PA66 copolyamide resulting from polycondensation of hexamethylene diamine and adipic acid.

More specifically, the polyamide units are chosen from PA6, PA66, PA 6/66, PA46, PA6T/66, PA6T/61/66, PA610, PA612, PA 69/12, PA 614, PA 6/12, PA11/12, PA12, PA11, PA1010, PA1012, PA618, PA10T, PA 6/12/66, PA 4T, PA 9T, PA12/10T, PA1010/10T, PA 6/6T/10T, PA 11/6T/10T, PA 12/6T/10T, PA 6/69/11/12, PA 6/66/11/12, PA11/10T, MXDT/10T, MPMDT/10T and BACT/10T and mixtures thereof.

Polyamide mixtures can be used. Advantageously, the relative viscosity of the polyamides, measured in a 1% solution in sulfuric acid at 20° C. is between 1.5 and 5.

The polyamide or polyamide mixture is preferably chosen sufficiently semi-crystalline, meaning with the melting enthalpy greater than or equal to 25 J/g (measured by DSC).

Preferably, the polyamide or mixture of polyamides must be usable at high service temperatures. One possible selection criterion is preferably to choose them with a melting point greater than or equal to 170° C.

For the purposes of the present invention, majority is understood to mean a proportion over 50% within the matrix.

The one or more polyamides represent 20 to 80% by weight in relation to the total weight of the composition.

Reinforcing Fibres

The composition constituting an envelope according to the invention comprises from 0 to 80% by weight in relation to the total weight of the composition of reinforcing fibres.

The fibres present in the composition of the envelope can have different dimensions.

The reinforcing fibres can be short, long or continuous. A mixture of these fibres of various dimensions and/or various type can also be used.

Preferably, the "short" fibres are between 200 and 400 μm long.

The long fibres have a length over 1000 μm.

These reinforcing fibres may be chosen from:

- mineral fibres, those having high melting temperatures Tm' greater than the melting temperature Tm of said polyamide present in the matrix of the composition of the compartment according to the invention and greater than the polymerization and/or implementation temperature;
- polymer fibres having a melting temperature Tm' or if not the Tm', a glass transition temperature Tg', greater than the polymerization temperature or greater than the melting temperature Tm of said polyamide present in the matrix of the composition of the compartment according to the invention and greater than the implementation temperature;
- natural fibres;
- or mixtures of the fibres cited above;

Examples of inorganic fibres suitable for the invention are carbon fibres, which includes fibres of nanotubes or carbon nanotubes (CNT), carbon nanofibres or graphenes; silica fibres such as glass fibres, in particular type E, R or S2; boron fibres; ceramic fibres, in particular silicon carbide fibres, boron carbide fibres, boron carbonitride fibres, silicon nitride fibres, boron nitride fibres, basalt fibres; fibres or filaments containing metals and/or their alloys; metal oxide fibres, in particular of alumina ($Al_2O_3$); metalized fibres such as metalized glass fibres and metalized carbon fibres or mixtures of previously cited fibres.

The length of the glass fibres is measured according to the ISO 22314:2006(E) standard.

The following can be listed as suitable polymer fibres for the invention:

- amorphous thermoplastic polymer-based fibres and have a glass transition temperature Tg greater than the Tg of the polyamide or mixture of polyamides present in the matrix when it is amorphous; or greater than the Tm of the polyamide or mixture of polyamides present in the matrix when it is semi-crystalline.

Advantageously, they are semi-crystalline thermoplastic polymer-based and have a melting point Tm greater than the Tg of the polyamide or polyamide mixture present in the matrix when the matrix is amorphous; or greater than Tm of the polyamide or mixture of polyamides present in the matrix when the matrix is semi-crystalline. Thus, there is no melting risk for the organic fibres making up the reinforcing material during the impregnation by the thermoplastic matrix of the final composite.

the thermosetting polymer fibres and more particularly chosen from: unsaturated polyesters, epoxy resins, vinyl esters, phenol resins, polyurethanes, cyanoacrylates and polyimides, such as bis-maleimide resins, aminoplasts resulting from the reaction of an amine such as melamine with an aldehyde such as glyoxal or formaldehyde;

- fibres of thermoplastic polymers and more particularly chosen from: polyethylene terephthalate (PET), polybutylene terephthalate (PBT);
- polyamide fibres;
- aramid fibres (such as Kevlar®) and aromatic polyamides such as those having one of the formulas: PPDT, MPDI, PAA and PPA, with PPD and MPD being respectively p- and m-phenylene diamine, PAA being polyarylamides and PPA being polyphthalamides;
- fibres of polyamide block copolymers such as polyamide/polyether, fibres of polyarylether ketones (PAEK) such as polyetherether ketone (PEEK), polyetherketone ketone (PEKK), polyetherketoneetherketone ketone (PEKEKK).

Among the fibres of natural origin, and in particular plant fibres, the following can be listed: fibres based on flax, ricin, wood, kenaf, coconut, hemp, jute, lignin, bamboo, silk, in particular spider silk, sisal and other cellulose fibres, in particular viscose. These plant fibres can be used pure, treated or coated with a coating layer, in order to improve the adherence and impregnation of the polymer matrix.

The reinforcing fibres can make up a fibrous material which can also be a fabric, braided or woven with fibres.

It can also correspond to fibres with support threads.

These component fibres can be used alone or in mixtures. Thus, organic fibres can be mixed with mineral fibres in order to be impregnated with the polymer matrix and to form the pre-impregnated fibrous material.

The organic fibre rovings can have several grammages. They can further have several geometries. The fibres can come in short fibre form, which then make up felts or nonwovens which can come in the form of strips, layers or pieces, or in continuous fibre form, which make up 2D fabrics, braids or rovings of unidirectional (UD) or nonwoven fibres. The component fibres of the fibrous material can further assume the form of a mixture of these reinforcing fibres with different geometries.

Preferably, the fibrous material is made up of continuous carbon, glass or silicon carbide fibres or mixture thereof, in particular carbon fibres. It is used in the form of a roving or several rovings.

Preferred short reinforcing fibres are short fibres chosen from: carbon fibres, including metalized fibres, glass fibres, including metalized glass fibres like E, R, S2, aramid fibres (like Kevlar®) or aromatic polyamides, polyarylether ketone (PAEK) fibres, such as polyetherether ketone (PEEK), polyetherketone ketone (PEKK) fibres, polyetherketoneetherketone ketone (PEKEKK) fibres or mixtures thereof.

Preferably, the reinforcing fibres are selected from glass, carbon, ceramic and aramid fibres or mixtures thereof.

According to one embodiment of the invention, an envelope of the compartment for the device according to the invention has heat conducting properties. According to this preferred embodiment, the reinforcing fibres will be preferably chosen from carbon fibres, boron nitride fibres.

According to another embodiment of the invention, an envelope of the compartment has heat insulating properties. According to this preferred embodiment, the reinforcing fibres will be preferably chosen from glass fibres, basalt fibres and aramid fibres.

More specifically, the reinforcing fibre content in the composition is between 20 and 80% by weight, by weight in relation to the total weight of the composition.

Depending on the size of the fibres used: short, long or continuous, the reinforcing fibre content can be different in the composition.

Thus, in the case of short-reinforcing fibres, the fibre content is preferably between 15 and 60% by weight of reinforcing fibres. In the case of long or continuous reinforcing fibres, the fibre content is preferably between 40 and 80% by weight of reinforcing fibres.

Thermoconductive Component

The composition constituting an envelope of the battery box for the device according to the invention comprises 0 to 20% by weight in relation to the total weight of the composition of at least one thermoconductive component, preferably from 0.1 to 20%, and more preferably from 5 to 20%.

The thermoconductive components allow giving the polymer matrix, which receives them, a thermal conductivity, or else increasing the thermal conductivity thereof.

The thermoconductive components can be chosen among carbon, carbon fibres, carbon black, for example that sold by Imerys under the tradename Ensaco 250G, carbon nanotubes (CNT), like for example those sold by Arkema under the form of MB Graphistrength®, extruded graphite like for example the Timrex®C-THERM™ product line, and in particular the Timrex®C-THERM™ 001 products sold by Imerys, aluminum nitride and boron nitride.

Impact Modifiers

The composition constituting an envelope of the battery box for the device according to the invention comprises from 0 to 20% by weight in relation to the total weight of the composition of at least one impact modifier.

The impact modifier is advantageously constituted by a polymer having a flexural modulus below 100 MPa measured according to ISO standard 178 at 50% RH and a Tg below 0° C. measured according to standard 11357-2 of 2013.

The glass transition temperature Tg of the polyamides is measured using a differential scanning calorimeter (DSC), after a second heating pass, according to ISO standard 1 1357-2:2013. The heating and cooling rate is 20° C./min.

Preferably, the impact modifier is formed of one or more polyolefins, a part or all thereof bearing a function chosen from the carboxylic acid, carboxylic anhydride and epoxide functions. Very specifically, the polyolefin can be chosen from an elastomeric ethylene and propylene copolymer (EPR), an elastomeric ethylene-propylene-diene copolymer (EPDM) and an ethylene/alkyl (meth)acrylate copolymer.

The composition may comprise up to 20% by weight, in relation to the total weight of said composition, of a semi-crystalline polyolefin or a mixture of polyolefins, having a flexural modulus, measured according to ISO standard 178 at 50% RH, over 300 MPa, advantageously over 800 MPa.

This impact modifier is a functionalized polyolefin (B1).

According to the invention, functionalized polyolefin (B1) is understood to mean the following polymers.

The functionalized polyolefin (B1) can be an alpha-olefin polymer having reactive units: the functionalities. Such reactive units are carboxylic acid, anhydride or epoxy functions.

The homopolymers or copolymers of alpha-olefins or diolefins can be given as examples, such as for example, ethylene, propylene, 1-butene, 1-octene, butadiene, and more specifically:

- the homopolymers and copolymers of ethylene, particularly LDPE, HDPE, LLDPE (linear low-density polyethylene), VLDPE (very low-density polyethylene) and metallocene polyethylene;
- homopolymers or copolymers of propylene;
- ethylene/alpha-olefin copolymers such as ethylene/propylene, EPRs (abbreviation for ethylene-propylene-rubber) and ethylene/propylene/diene (EPDM).
- styrene/ethylene-butene/styrene (SEBS), styrene/butadiene/styrene (SBS), styrene/isoprene/styrene (SIS), styrene/ethylene-propylene/styrene (SEPS) block copolymers;
- copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight.

These polyolefins described above can be grafted, copolymerized or terpolymerized by reactive units (the functionalities), such as carboxylic acid, anhydride or epoxy functions.

More specifically these polyolefins are grafted or co- or ter-polymerized by unsaturated epoxides such as glycidyl (meth)acrylate, or by carboxylic acids or the corresponding salts or esters such as (meth)acrylic acid (which can be completely or partially neutralized by metals such as Zn, etc.) or by carboxylic acid anhydrides such as maleic anhydride.

The functionalized polyolefin (B1) can be chosen from the following, maleic anhydride or glycidyl methacrylate grafted, (co)polymers wherein the graft rate is for example from 0.01 to 5% by weight:

- of PE, of PP, of copolymers of ethylene with propylene, butene, hexene, or octene containing for example from 35 to 80% by weight of ethylene;
- ethylene/alpha-olefin copolymers such as ethylene/propylene, EPRs (abbreviation for ethylene-propylene-rubber) and ethylene/propylene/diene (EPDM);
- styrene/ethylene-butene/styrene (SEBS), styrene/butadiene/styrene (SBS), styrene/isoprene/styrene (SIS), styrene/ethylene-propylene/styrene (SEPS) block copolymers;
- ethylene and vinyl acetate copolymers (EVA), containing up to 40% by weight of vinyl acetate;
- ethylene and alkyl (meth)acrylate copolymers, containing up to 40% by weight of alkyl (meth)acrylate;
- ethylene and vinyl acetate (EVA) and alkyl (meth)acrylate copolymers, containing up to 40% by weight of comonomers.

A functionalized polyolefin is for example a PE/EPR mixture, the ratio by weight whereof can vary widely, for example between 40/60 and 90/10, said mixture being co-grafted with an anhydride, in particular maleic anhydride, according to a graft rate for example of 0.01 to 5% by weight.

The functionalized polyolefin (B1) can also be chosen from ethylene/propylene copolymers with a majority of maleic anhydride grafted propylene condensed with a mono-amine polyamide (or a polyamide oligomer) (products described in EP-A-0,342,066).

The functionalized polyolefin (B1) can also be a co- or terpolymer of at least the following units:

(1) ethylene;

(2) alkyl methacrylate or saturated carboxylic acid vinyl ester; and (3) anhydride such as maleic or methacrylic anhydride or epoxies such as glycidyl methacrylate.

As an example of functionalized polyolefins of the latter type, mention may be made of the following copolymers, where ethylene represents preferably at least 60% by weight and where the termonomer (the function) represents for example from 0.1 to 12% by weight of the copolymer:

- ethylene/alkyl (meth)acrylate/(meth)acrylic acid or maleic anhydride or glycidyl methacrylate copolymers;
- ethylene/vinyl acetate/maleic anhydride or glycidyl methacrylate copolymers;
- ethylene/vinyl acetate or alkyl (meth)acrylate/(meth) acrylic acid or maleic anhydride or glycidyl methacrylate copolymers.

In the preceding copolymers, (meth)acrylic acid can be salified with Zn or Li.

The term "alkyl (meth)acrylate" in (B1) denotes $C_1$ to $C_8$ methacrylates and alkyl acrylates, and can be chosen from methyl acrylate, ethyl acrylate, n-butyl acrylate, isobutyl acrylate, 2-ethyl-hexyl acrylate, cyclohexyl acrylate, methyl methacrylate and ethyl methacrylate.

Moreover, the previously cited polyolefins (B1) may also be crosslinked by any appropriate method or agent (diepoxy, diacid, peroxide, etc.); the term functionalized polyolefin also comprises mixtures of the previously cited polyolefins with a difunctional reagent such as a diacid, dianhydride, diepoxy, etc. that can react with these or mixtures of at least two functionalized polyolefins that can react together.

The copolymers mentioned above (B1) may be statistically or sequentially copolymerized and have a linear or branched structure.

The molecular weight, MFI, and density of these polyolefins can also vary widely, which the person skilled in the art will know. MFI, abbreviation for melt flow index, is a measure of fluidity when melted. It is measured according to ASTM 1238 standard.

Advantageously the functionalized polyolefins (B1) are chosen from any polymer comprising alpha-olefin units and units carrying polar reactive functions like epoxy, carboxylic acid or carboxylic acid anhydride functions. As examples of such polymers, mention may be made of terpolymers of ethylene, alkyl acrylate and maleic anhydride or glycidyl methacrylate like Lotader® from the Applicant or maleic anhydride grafted polyolefins like Orevac® from the Applicant and terpolymers of ethylene, alkyl acrylate and (meth) acrylic acid. Mention may also be made of homopolymers or copolymers of by a carboxylic acid anhydride grafted polypropylene then condensed with polyamides or polyamide monoamine oligomers, as described in the application EP 0,342,066.

More specifically, the functionalized polyolefins (B1) are:

- ethylene, alkyl acrylate and maleic anhydride terpolymers;
- ethylene, alkyl acrylate and glycidyl methacrylate terpolymers;
- maleic anhydride grafted polypropylenes and polyethylenes;
- maleic anhydride grafted ethylene and propylene copolymers and possibly diene monomer;
- maleic anhydride grafted ethylene and octene copolymers;
- and mixtures thereof.

The functionalized polyolefin (B1) is present with a concentration of between 0 and 20% by weight, preferably between 1 and 10% by weight in relation to the total weight of the composition.

Advantageously, the composition according to the invention can comprise at least one non-functionalized polyolefin (B2).

A non-functionalized polyolefin (B2) is conventionally a homopolymer or copolymer of alpha-olefins or diolefins, such as for example, ethylene, propylene, 1-butene, 1-octene, butadiene. As examples, mention may be made of:

- the homopolymers and copolymers of polyethylene, particularly LDPE, HDPE, LLDPE (linear low-density polyethylene), VLDPE (very low density polyethylene) and metallocene polyethylene.
- homopolymers or copolymers of propylene;
- ethylene/alpha-olefin copolymers such as ethylene/propylene, EPRs (abbreviation for ethylene-propylene-rubber) and ethylene/propylene/diene (EPDM).

styrene/ethylene-butene/styrene (SEBS), styrene/butadiene/styrene (SBS), styrene/isoprene/styrene (SIS), styrene/ethylene-propylene/styrene (SEPS) block copolymers;

- copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight;
- and mixtures thereof.

The copolymers mentioned above (B2) may be statistically or sequentially copolymerized and have a linear or branched structure.

Advantageously the non-functionalized polyolefins (B2) are chosen from homopolymers or copolymers of polypropylene and any ethylene homopolymer or ethylene copolymer and a higher alpha-olefin comonomer such as butene, hexene, octene or 4-methyl-1-pentene. PP (polypropylene), high density polyethylene, medium-density polyethylenes, linear low-density polyethylenes, low-density polyethylenes and very low-density polyethylenes can be cited as examples. These polyethylenes are known by the person skilled in the art as being products from a free-radical method, from a Ziegler catalysis method, or, more recently, from metallocene catalysis. The copolymers of ethylene and vinyl acetate (EVA) are also preferred, such as those sold under the tradename EVATANE® by the Applicant.

When the composition constituting an envelope of the device according to the invention comprises one or more non-functionalized polyolefins, the MFI of (A) and the MFIs of (B1) and (B2) can be chosen over a wide range, it is however recommended that the viscosities of (B1) and (B2) be close so as to improve the dispersion of (B1) and (B2).

The non-functionalized polyolefin is present with a concentration of between 0 and 20% by weight, preferably between 1 and 10% by weight in relation to the total weight of the composition.

The impact modifier can also be a copolymer formed of polyamide blocks and polyether blocks, where the polyamide blocks and polyether blocks are linked by an ester function. These products are described in the document FR 2,273,021 and sold by Arkema under the PEBAX® tradename.

The copolymers with polyamide blocks (abbreviated PA below) and polyether blocks (abbreviated PE below) result from the copolycondensation of polyamide blocks with reactive ends with polyether blocks with reactive ends. For example, the following can be reacted:

- the polyetherdiol, and a carboxylic diacid polyamide;
- the polyetherdiamine and a carboxylic diacid polyamide;
- the polyetherdiol and a diamine polyamide.

The block polyamides with dicarboxylic chain ends come for example from condensation of polyamide precursors in presence of a chain regulator carboxylic diacid. The block polyamides with diamine chain ends come for example from condensation of polyamide precursors in the presence of a chain regulator diamine. Thus, the bond between the blocks is either an ester bond or an amide bond The polymers with PA blocks and PE blocks can comprise a single PA block and a single PE block.

They may also comprise several structurally identical PA blocks of the one or more monomers constituting the polyamide and identical PE distributed randomly. Said polymers may be prepared by simultaneous reaction of PE blocks and PA block precursors. A polymer results having PE blocks and PA blocks with highly variable length depending on the moment at which the chain regulator acts during the formation of the PA block, but also the various reagents having randomly reacted which are distributed randomly (statistically) along the polymer chain.

The composition constituting an envelope of the battery box for the device according to the invention comprises 0 to 20% by weight in relation to the total weight of the composition of at least one impact modifier, preferably from 0.1 to 20%, and more preferably from 5 to 20%.

Additives

The composition making up a battery box envelope for the device according to the invention can also comprise from 0 to 20% additives.

Preferably, the additives present in the composition forming the compartment are chosen from thermal stabilizers, plasticizers, lubricants, organic or inorganic pigments, anti-UV, antistatic, mineral fillers and organic fillers.

This thermal stabilizer can be chosen from a copper-based stabilizer, an organic stabilizer and a mixture thereof.

The copper-based stabilizer can be made up of one or more constituents chosen from copper-based compounds such as cuprous chloride, cupric chloride, cuprous bromide, cupric bromide, cuprous iodide, cupric iodide, cuprous acetate and cupric acetate.

Halides, and acetates of other metals such as silver can be listed. These copper-based compounds are typically associated with halides of alkali metals. A well-known example is the mixture of CuI and KI, where the Cut KI ratio is typically inclusively between 1:5 to 1:15. An example of such a stabilizer is Ciba's Polyadd P201.

More details on stabilizers containing copper are found in U.S. Pat. No. 2,705,227. More recently, copper-based stabilizers such as copper complexes like Bruggemann's Bruggolen H3336, H3337, H3373 have appeared.

The copper-based stabilizer is chosen from copper halides, copper acetate, copper halides or copper acetate in mixture with at least one alkaline metal halide, and mixtures thereof, preferably mixtures of copper iodide and potassium iodide (CuI/KI).

The organic stabilizer can be chosen, without this list being restrictive, from:

- phenol antioxidants, for example Ciba's Irganox 245, Irganox 1010, Irganox 1098, Ciba's Irganox MD1024, Great Lakes' Lowinox 44B25;
- phosphorus-based stabilizers, such as phosphites, for example Ciba's Irgafos® 168;
- a UV absorber, such as Ciba's Tinuvin 312,
- a HALS, as previously stated,
- an amine type stabilizer, such as Crompton's Naugard 445, or even a hindered amine type such as Ciba's Tinuvin 770,
- a polyfunctional stabilizer such as Clariant's Nylostab S-EED.

A mixture of two, or more, of these organic stabilizers can obviously be envisaged.

The quantity of thermal stabilizer(s) within the composition is preferably between 0.05 and 5% by weight, in relation to the total weight of the composition.

The additives can in particular be chosen from plasticizers, such as BBSA (N-(n-butyl) benzene sulfonamide), lubricants, for example stearic acid; organic or inorganic pigments; anti-UV; antistatics; mineral fillers, such as, for example, talc, calcium carbonate, titanium dioxide, zinc oxide and organic fillers.

Among the fillers, silica, titanium oxide or even glass beads can be listed.

Preferably, the additives are present in the composition generally at a concentration from 0.1 to 15% by weight, preferably 1 to 15 by weight in relation to the total weight of the composition.

Flameproofing Agent

The composition constituting an envelope for the compartment comprises a matrix which may comprise at least one flame retardant.

Preferably, the flameproofing agent is selected from halogen-free flameproofing agents, such as described in US 2008/0,274,355 and in particular a metal salt chosen from a phosphinic acid metal salt, a metal salt of diphosphinic acid, a polymer containing at least one metal salt of phosphinic acid, a polymer containing at least one metal salt of diphosphinic acid. The flameproofing agent can also be selected from red phosphorus, antimony oxide, zinc oxide, iron oxide, magnesium oxide, metal borates, such as zinc borate, melamine pyrophosphates, melamine cyanurates, and siliconated or fluoridated type non-drip agents.

The flameproofing agent can also be a mixture of the aforementioned retardants.

They may also be halogenated flame-retardant agents such as a brominated or polybrominated polystyrene, a brominated polycarbonate or a brominated phenol.

Preferably, the phosphinic acid metal salt according to the invention has the formula (I) below and the diphosphinic acid metal salt has the formula (II) below:

(I)

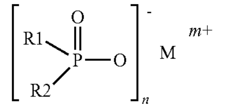

(II)

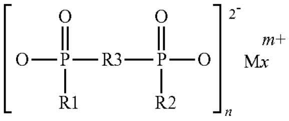

with $R_1$ and $R_2$, independently of each other, designate a linear or branched $C_1$-$C_6$ alkyl group or an aryl group;

$R_3$ represents a linear or branched $C_1$-$C_{10}$ alkylene, a $C_6$-$C_{10}$ arylene, a $C_6$-$C_{10}$ alkylarylene, or $C_6$-$C_{10}$ arylalkylene group;

M is a Mg, Ca, Al, Sb, Sn, Ge, Ti, Zn, Fe, Zr, Ce, Bi, Sr, Mn, Li, Na, K and/or a protonated amine base;

m is an integer ranging from 1 to 4;

n is an integer ranging from 1 to 4;

x is an integer ranging from 1 to 4;

where n and m are chosen such that the salt is neutral, meaning that it does not carry a net electrical charge.

Preferably, M represents a calcium, magnesium, aluminum or zinc ion.

Preferably $R_1$ and $R_2$, independent of each other, designate a methyl, ethyl, n-propyl, iso-propyl, n-butyl, tertiary-butyl, n-pentyl and/or phenyl group.

Preferably, $R_3$ represents a methylene, ethylene, n-propylene, iso-propylene, n-butylene, tert-butylene, n-pentylene, n-octylene, n-dodecylene, phenylene, naphthalene, methylphenylene, ethylphenylene, tertiary-butylphenylene, methyl naphthalene, ethylnaphthalene, tert-butylnaphthalene, phenylmethylene, phenylethylene, phenylpropylene, or phenylbutylene group.

More specifically, the flame-retardant content that may be present in the matrix of the composition is between 10 and 30% by weight, preferably 15 and 25% by weight, and more specifically between 17 and 22% by weight in relation to the total weight of the polyamide(s) present in the composition.

The Positions of the Envelopes and the Number Thereof

The compartment for the device may comprise one or more envelopes.

According to one embodiment of the device according to the invention, the device comprises a single layer compartment, meaning consisting of a single envelope. This envelope is then described as outer envelope.

Advantageously, the envelope has a thermal conductivity (λ) less than or equal to 10 W/m·K, preferably between 10 and 0.3 W/m·K, more preferably between 1 and 0.1 W/m·K.

Even more advantageously, the outer envelope comprises:

20 to 80% by weight in relation to the total weight of the composition of reinforcing fibres, which do not have thermally conducting properties;

0 to 20% by weight in relation to the total weight of at least one impact modifier, preferably from 0.1 to 20%, and more preferably from 5 to 20%;

0 to 20% by weight in relation to the total weight of the composition of additives, preferably from 0.1 to 15%, and more preferably from 1 to 15%;

where the complement is a matrix comprising mostly at least one polyamide and at least one flameproofing agent.

The device is going to make it possible to limit heat exchanges between the battery and the outside of the device.

According to another embodiment, the device comprises at least two envelopes, an inner envelope disposed facing the battery, the composition whereof is according to the invention and an outer envelope forming with the inner envelope a passage intended for the flow of heat transfer fluid.

Preferably, the ratio of the thermal conductivity (λ) of the inner envelope to the thermal conductivity (λ) of the outer envelope is at least greater than 1.5, preferably ranging from 1.5 to 300, more particularly from 2 to 100 and more preferably from 2 to 50.

Advantageously, the inner envelope comprises:

0 to 80% by weight in relation to the total weight of the composition of reinforcing fibres, preferably from 0.1 to 80%, and more preferably from 5 to 80%;

0 to 20% by weight in relation to the total weight of at least one thermoconductive component, preferably from 0.1 to 20%, and more preferably from 5 to 20%;

0 to 20% by weight in relation to the total weight of at least one impact modifier, preferably from 0.1 to 20%, and more preferably from 5 to 20%;

0 to 20% by weight in relation to the total weight of the composition of additives, preferably from 0.1 to 15%, and more preferably from 1 to 15%;

where the complement is a matrix comprising mostly at least one polyamide and at least one flameproofing agent; and the outer envelope comprises:

20 to 80% by weight in relation to the total weight of the composition of reinforcing fibres, which do not have thermally conducting properties;

0 to 20% by weight in relation to the total weight of at least one impact modifier, preferably from 0.1 to 20%, and more preferably from 5 to 20%;

0 to 20% by weight in relation to the total weight of the composition of additives, preferably from 0.1 to 15%, and more preferably from 1 to 15%;

where the complement is a matrix comprising mostly at least one polyamide.

According to this embodiment, a heat transfer fluid can flow between these two envelopes, where the inner envelope allows recovery of heat released by the battery and the outer envelope allows limiting the heat exchanges with the outside of the device, the purpose of the device being to recover the maximum of heat released by the battery.

When the reinforcing fibres have thermally conducting properties, like for example carbon fibres, CNT, carbon nano-fibres or graphenes, then the presence of a thermoconductive component in the inner envelope is not indispensable.

According to a specific embodiment, the inner envelope comprises:

0 to 80% by weight in relation to the total weight of the composition of reinforcing fibres, which do not have thermally conducting properties, preferably from 0.1 to 80%, and more preferably from 5 to 80%;

10 to 20% by weight in relation to the total weight of the composition of at least one thermoconductive component;

0 to 20% by weight in relation to the total weight of at least one impact modifier, preferably from 0.1 to 20%, and more preferably from 5 to 20%;

0 to 20% by weight in relation to the total weight of the composition of additives, preferably from 0.1 to 15%, and more preferably from 1 to 15%;

where the complement is a matrix comprising mostly at least one polyamide and at least one flameproofing agent.

According to another specific embodiment, the inner envelope comprises:

0 to 80% by weight in relation to the total weight of the composition of reinforcing fibres, which have thermally conducting properties, preferably from 0.1 to 80%, and more preferably from 5 to 80%;

0 to 20% by weight in relation to the total weight of at least one thermoconductive component, preferably from 0.1 to 20%, and more preferably from 5 to 20%;

0 to 20% by weight in relation to the total weight of at least one impact modifier, preferably from 0.1 to 20%, and more preferably from 5 to 20%;

0 to 20% by weight in relation to the total weight of the composition of additives, preferably from 0.1 to 15%, and more preferably from 1 to 15%;

where the complement is a matrix comprising mostly at least one polyamide and at least one flameproofing agent.

According to a feature, the inner envelope can be arranged at least in part in contact with the battery.

Alternatively, a space can be provided between the battery and the inner envelope.

Advantageously, when the battery comprises a plurality of adjacent cell packs, then the inner envelope encapsulates the assembly of cells by complementarity of shape.

According to another feature, the inner envelope and the outer envelope can be coated on the inside and/or the outside with a layer having a low water permeability.

By having one or more layers with a low water permeability a moisture barrier effect can be provided, meaning sealing the battery against heat transfer fluid or the environment outside the battery box depending on the location thereof.

For the purposes of the present invention, inner is understood to mean a layer arranged facing the passage for the heat transfer fluid.

For the purposes of the present invention, outer is understood to mean a layer arranged facing the outside of the battery box or facing the battery, the opposite of a layer arranged facing the passage for the heat transfer fluid.

In particular, according to an embodiment in which the selected heat transfer fluid is liquid, for example glycol water, the one or more layers having a low water permeability serve to avoid, according to the placement thereof, fluid leaks towards the battery or towards the outside of the cooling and/or heating device.

According to a preferred embodiment, this/these layer(s) can be of EVOH, polyolefins, such as polypropylene or polyethylenes: HDPE, LDPE.

According to a first embodiment of the invention, the compartment comprises at least two envelopes, with low water permeability layers disposed inside and outside the inner envelope.

According to a second embodiment of the invention, the compartment comprises at least two envelopes, with low water permeability layers disposed inside and outside the inner envelope, and inside the outer envelope.

According to a third embodiment of the invention, the compartment comprises at least two envelopes, with low water permeability layers disposed inside the inner envelope and inside the outer envelope.

Measurement of the Thermal Conductivity

Thermal conductivity measurements of materials are done according to the HOT DISK technology such as described in the ISO 22007-2 standard.

Method for Preparation of the Composition

The invention also covers a method for preparation of the composition such as defined above. According to this method, the composition can be prepared by any method which makes it possible to obtain a homogeneous mixture containing the composition according to the invention, and optionally other additives, such as molten state extrusion, compacting, or even roller mixer while considering the size of the reinforcing fibres.

Advantageously, the usual devices from the thermoplastics industry for mixing or kneading are used such as extruders, such as the double-screw type extruders, and kneaders, for example BUSS co-kneaders.

Method for Production of the Compartment

Depending on the size of the fibres, the battery box according to the invention can be made by various techniques.

When the fibres are short, the battery box according to the invention can be obtained by injection, extrusion, co-extrusion, hot compression, and multi-injection of at least one composition such as defined above.

When the fibres are long or continuous, the battery box according to the invention can be made by various techniques chosen from: pultrusion, filament winding, thermal compression, infusion molding, resin transfer molding (RTM), structured reaction and injection molding (S-RIM) or injection-compression molding. A specific closed mold technique is RTM or S-RIM or injection-compression. The term "resin" in RTM here identifies the composition according to the invention without the reinforcing fibres.

According to a specific embodiment, the production method may comprise:

- a step of application of the reinforcing fibres in the mold, and then
- at least one step of impregnation of said fibres by a precursor composition of the composition according to the invention.

Precursor composition of the composition according to the invention is understood to mean a composition according to the invention such as defined above, but which does not comprise reinforcing fibres.

Circuit

The present invention also relates to a cooling and/or heating circuit for an electric or hybrid motor vehicle battery, comprising a main heat transfer fluid circulation loop provided with means intended for circulation of the heat transfer fluid in the main loop.

Further, the main loop is connected to a reversible heat pump and a cooling and/or heating device such as previously described.

According to various embodiments, the heat transfer fluid can be a gas, for example air, or a liquid, for example glycol water.

According to a characteristic of the invention, the circuit may comprise at least one secondary loop connected to the main loop, where the one or more secondary loops are connected to the motor vehicle passenger compartment and/or to an electronic circuit connected to the electric motor of the motor vehicle when the motor vehicle is a hybrid.

Advantageously, the circuit may comprise a control device configured for controlling the heat transfer from the main loop to the at least one secondary loop such as previously defined.

Other goals, advantages and features will emerge from the following description given as a purely illustrative example and made with reference to the attached drawings in which:

FIG. 3 shows an outer envelope configuration alternative to the outer envelope shown in FIG. 2.

FIGS. 1 to 3 show two embodiments of a cooling and/or heating device for an electric or hybrid vehicle battery conforming to the invention.

Figure 1:
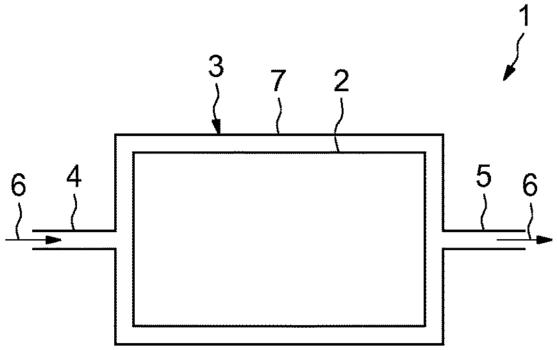
FIG. 1 is a sectional view of a cooling and/or heating device for a battery for electric or hybrid motor vehicle according to a first embodiment of the invention, where the device comprises a battery box comprising an envelope.

In FIG. 1, the cooling and/or heating device, designated by the general numeric reference 1, for a battery 2 comprises a battery box 3. The compartment 3 shown is provided with an envelope 7 comprising:

- 20 to 80% by weight in relation to the total weight of the composition of reinforcing fibres;
- 0 to 20% by weight in relation to the total weight of at least one thermoconductive component, preferably from 0.1 to 20%, and more preferably from 5 to 20%;
- 0 to 20% by weight in relation to the total weight of at least one impact modifier, preferably from 0.1 to 20%, and more preferably from 5 to 20%;
- 0 to 20% by weight in relation to the total weight of the composition of additives, preferably from 0.1 to 15%, and more preferably from 1 to 15%;
- where the complement is a matrix comprising mostly at least one polyamide and at least one flameproofing agent;
- where the compartment 3 delimits a cooling and/or heating volume for the battery.

Further, the device 1 is provided with an inlet and an outlet, respectively 4 and 5, for the passage of a heat transfer fluid 6. The configuration of the device 1 shown advantageously allows the passage of the heat transfer fluid 6 in contact with the battery 2 from the inlet 4 to the outlet 5.

Advantageously, the envelope 7 has a thermal conductivity (λ) less than or equal to 10 W/m·K. The envelope 7 then advantageously has thermal insulation properties making it possible, in particular, to avoid a loss of heat through the envelope 7.

Further, the specific proportion of reinforcing fibres gives the envelope 7 a high mechanical resistance, suited to the location of the envelope 7, meaning in contact with the outside environment.

Figure 2:
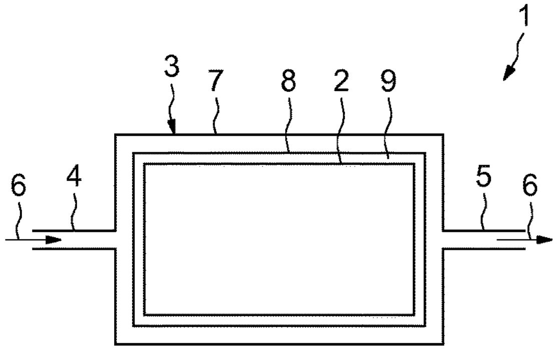
FIG. 2 is a sectional view of a cooling and/or heating device for a battery for electric or hybrid motor vehicle according to a second embodiment of the invention, where the device comprises a battery box comprising inner and outer envelopes.

In FIG. 2, the cooling and/or heating device 1 shown comprises two envelopes. An inner envelope 8 is arranged facing the battery 2. An outer envelope 7 forms a passage with the inner envelope 8 intended for the flow of heat transfer fluid 6. In this example, the fluid 6 circulates between the outer and inner, 7 and 8, envelopes, and not in contact with the battery 2.

The inner envelope 8 comprises:

0 to 80% by weight in relation to the total weight of the composition of reinforcing fibres, preferably from 0.1 to 80%, and more preferably from 5 to 80%;

0 to 20% by weight in relation to the total weight of at least one thermoconductive component, preferably from 0.1 to 20%, and more preferably from 5 to 20%;

0 to 20% by weight in relation to the total weight of at least one impact modifier, preferably from 0.1 to 20%, and more preferably from 5 to 20%;

0 to 20% by weight in relation to the total weight of the composition of additives, preferably from 0.1 to 15%, and more preferably from 1 to 15%;

where the complement is a matrix comprising mostly at least one polyamide and at least one flameproofing agent.

The outer envelope 7 comprises:

20 to 80% by weight in relation to the total weight of the composition of reinforcing fibres, which do not have thermally conducting properties;

0 to 20% by weight in relation to the total weight of at least one impact modifier, preferably from 0.1 to 20%, and more preferably from 5 to 20%;

0 to 20% by weight in relation to the total weight of the composition of additives, preferably from 0.1 to 15%, and more preferably from 1 to 15%;

where the complement is a matrix comprising mostly at least one polyamide.

Further, the ratio of the thermal conductivity (λ) of the inner envelope 8 to the thermal conductivity (λ) of the outer envelope 7 is at least greater than 1.5.

In the example shown, a space 9 is provided between the battery 2 and the inner envelope 8. According to an alternative, the inner envelope 8 could be arranged, at least in part, in contact with the battery so as to optimize the heat transfer between the battery 2 and the heat transfer fluid 6.

Figure 3:
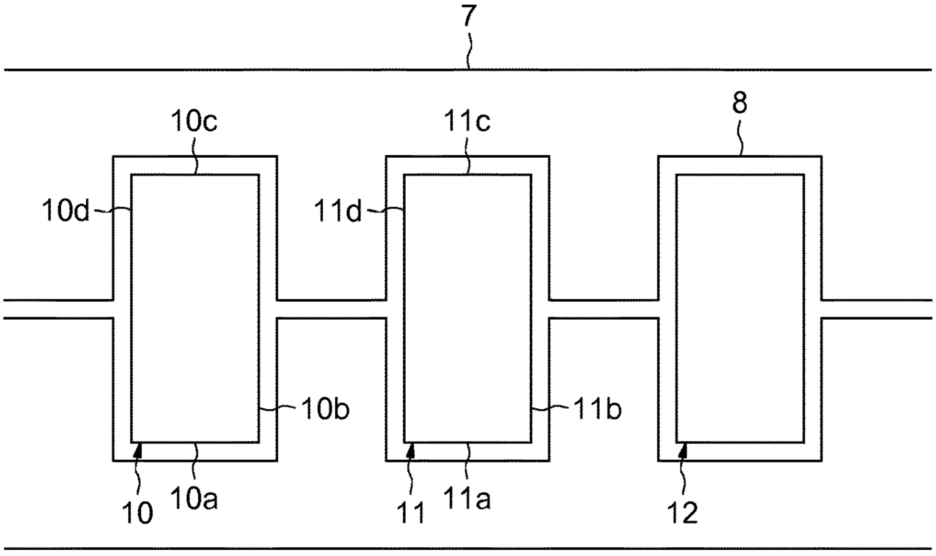
FIG. 3 is a sectional view of a portion of a cooling and/or heating device for a battery for electric or hybrid motor vehicle, where the device comprises a battery box comprising inner and outer envelopes, and where

Conventionally, the battery 2 comprises a plurality of adjacent cell packs. According to another example shown in FIG. 3, it is conceivable that the inner envelope 8 is inserted between two adjacent cell packs. FIG. 3 shows schematically a portion of the battery 2 comprising three identical cell packs 10, 11 and 12. Reference will be made to the adjacent packs 10 and 11 each comprising four walls, respectively 10*a*, 10*b*, 10*c*, 10*d* and 11*a*, 11*b*, 11*c*, 11*d*. In the example shown, the inner envelope 8 is arranged in part facing the walls 10*a*, 10*b*, 10*c*, 10*d* of pack 10 and the walls 11*a*, 11*b*, 11*c*, 11*d* of pack 11.

The inner envelope 8 thus extends closest to the cell packs of battery 2 so as to follow their shape, thus allowing improvement of the heat transfer between the battery 2 and the heat transfer fluid 6 for a better energy recovery. Advantageously, such an envelope 8 adapted to the complex geometry of the battery 2 can easily and quickly be manufactured because of the polyamide composition.

Advantageously, the inner and outer envelopes can be coated with a layer having a low water permeability. The one or more layers (not shown in the figures) can be inner or outer.

Preferably, at least one layer with a low water permeability is arranged in contact with the inner envelope 8, on the inside, meaning in contact with the heat transfer fluid 6.

The function of the heat transfer fluid (6) is to transfer the heat between two or more temperatures sources. This fluid can be a gas, air or even a liquid.

A composition of an envelope of the battery box conforming to the invention involves a better thermal transfer between the battery and the heat transfer fluid, and therefore an optimized cooling and/or heating of the battery.

The invention claimed is:

1. A cooling and/or heating device for an electric or hybrid motor vehicle battery comprising:

a battery box provided with only a single enveloping layer, which is an outer envelope made up of a composition comprising:

20 to 80% by weight in relation to the total weight of the composition of reinforcing fibers which do not have thermally conducting properties;

0 to 20% by weight in relation to the total weight of at least one thermoconductive component;

0 to 20% by weight in relation to the total weight of at least one impact modifier; and 0 to 20% by weight in relation to the total weight of the composition of additives, wherein the remainder of the outer envelope is a matrix comprising at least one polyamide and at least one flameproofing agent, wherein the outer envelope has a thermal conductivity between 1 and 0.1 W/mK;

a heat transfer fluid inlet; and a heat transfer fluid outlet, wherein the battery box delimits a cooling and/or heating volume for the electric or hybrid motor vehicle battery, wherein the cooling and/or heating device is configured to utilize liquid heat transfer fluid.

2. A cooling and/or heating circuit for an electric hybrid motor vehicle battery, comprising a main circulation loop for a heat transfer fluid provided with means intended for the circulation of the heat transfer fluid in the main loop, wherein the main loop is connected to a reversible heat pump and a cooling and/or heating device according to claim 1.

3. The cooling and/or heating circuit according to claim 2, in combination with liquid heat transfer fluid flowing through the cooling and/or heating circuit.

4. The cooling and/or heating device according to claim 1, in combination with liquid heat transfer fluid flowing through the cooling and/or heating device.

5. The cooling and/or heating device according to claim 1, wherein the heat transfer fluid inlet and the heat transfer fluid outlet are the only openings of the battery box.

* * * * *